US006926511B1

(12) United States Patent
Schulze et al.

(10) Patent No.: US 6,926,511 B1
(45) Date of Patent: Aug. 9, 2005

(54) ROTARY-TABLE PRESS WITH REMOVABLE PUNCHES

(75) Inventors: Herbert Schulze, Berlin (DE); Dietrich Garbe, Berlin (DE); Jürgen Pagel, Berlin (DE)

(73) Assignee: Korsch Pressen AG, Berlin (DE)

( * ) Notice: Subject to any disclaimer, the term of this patent is extended or adjusted under 35 U.S.C. 154(b) by 0 days.

(21) Appl. No.: 09/936,959

(22) PCT Filed: Mar. 17, 2000

(86) PCT No.: PCT/EP00/02372

§ 371 (c)(1),
(2), (4) Date: Nov. 28, 2001

(87) PCT Pub. No.: WO00/56534

PCT Pub. Date: Sep. 28, 2000

(30) Foreign Application Priority Data

Mar. 18, 1999 (DE) ................................ 199 13 979
Dec. 17, 1999 (DE) ................................ 199 63 263

(51) Int. Cl.[7] ................................................ B29C 43/08
(52) U.S. Cl. ................... 425/345; 425/348 R; 425/353
(58) Field of Search ....................... 425/78, 345, 348 R, 425/353, 355, 352

(56) References Cited

U.S. PATENT DOCUMENTS 3,118,183 A * 1/1964 Gex et al. ................... 425/345
4,443,171 A * 4/1984 Dixon ......................... 425/78
4,487,566 A * 12/1984 Barna ......................... 425/345
5,116,214 A * 5/1992 Korsch et al. .............. 425/345
5,906,837 A * 5/1999 Link et al. ..................... 425/78
6,595,767 B1 * 7/2003 Hinzpeter et al. .......... 425/345

FOREIGN PATENT DOCUMENTS

DE 88 16 064.5 2/1989

OTHER PUBLICATIONS

Korsch Pressen GmbH, Rückblick und Ausblick; Mar. 1995.

* cited by examiner

*Primary Examiner*—Benjamin L. Utech
*Assistant Examiner*—Thu Khanh T. Nguyen
(74) *Attorney, Agent, or Firm*—Norris McLaughlin & Marcus PA

(57) ABSTRACT

The invention relates to a rotary press with anti-rotation secured shafts and exchangeable punches attached thereto. The rotary press comprises a punch turn which is universally ensured with the use of anti-rotation secured punch shafts, meaning, not only with rotation-symmetrical but also with roll-guided punches, is solved in such a way that the exchangeable punch is executed in a rotational manner, where a circumferential recess in the stem of the punch is envisaged, into which a component such as a spring thrust piece engages for the purpose of fixation, and that the shell surface of the exchangeable punch indicates a zone which interacts with a zone of the external component, either force-locking or positive locking, in such a way that the punch receives a turning movement at a defined point of the pitch circle of the punch circumference.

15 Claims, 3 Drawing Sheets

Figure 2:
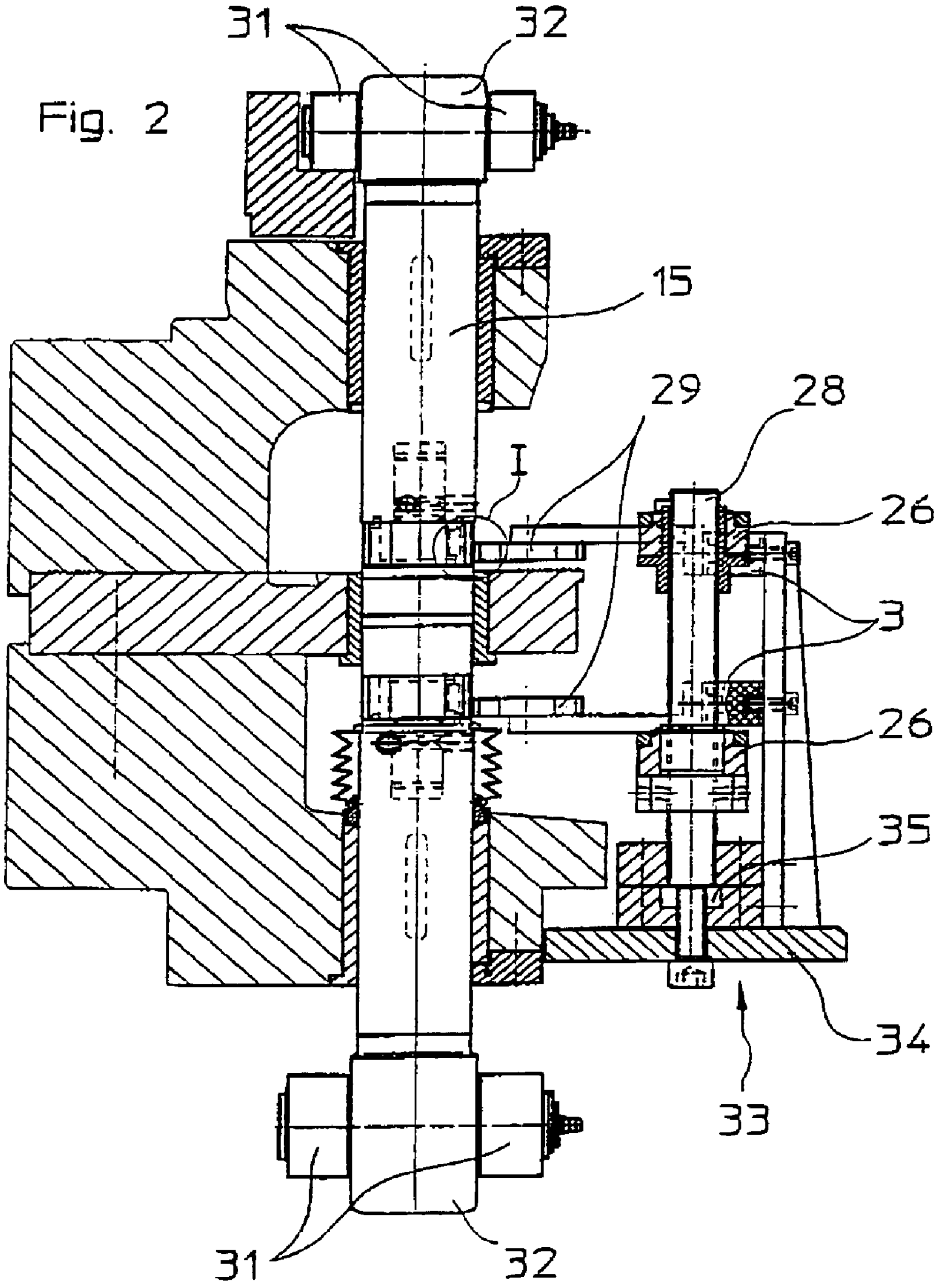

(Detail I aus Fig.2)

ROTARY-TABLE PRESS WITH REMOVABLE PUNCHES

DESCRIPTION

The invention concerns a rotary press with exchangeable punches.

The known rotary presses for pressing tablets in particular essentially consist of a rotor with a die table, an upper and lower part, where the upper part and the lower part contain and guide the upper and lower punches engaging in the dies of the die table.

Rotary presses with devices for turning the punches and rotary presses with anti-rotation secured shafts and exchangeable punches attached thereto are known (Technical Rotary Presses of Messrs Korsch Pressen AG/Series TRP 700, which have been on the market since approximately 1995 (information release of Korsch Pressen GmbH for customers, representatives and staff members, Edition No. 1, March 1995)).

In the DE-GM 88 16 064 a rotary press is described where the upper and lower punches have rotational movement around their longitudinal axis directly after passing the press rolls acting on them. The rotation of the upper and lower punches around their longitudinal axis is effected either by means of a frictional connection of the upper and lower punches with acting press rolls arranged directly behind the upper and lower punches, with spring force against the upper and lower punches forward-pressable guide curve sections or by means of an interaction of a serration with a stationary located spur rack arranged at the punch shaft.

By means of the rotational movement of the upper and lower punches directly after the pressing operation and during the withdrawal of the upper and lower punches from the die of the die table, a separation of the upper surface of the pressed tablet from the upper punch should be achieved as a minimum. Where particularly adhesive materials to be pressed are concerned, a rotational movement of the lower punch is also to avoid the adhesion between this and the underneath side of the tablet.

A disadvantage in the frictional connection between the upper and lower punches and the related guide curve sections is, however, the fact that wear of the material occurs in this case and, on the other hand, no defined rotation of the upper and lower punches is carried out. Subsequently, with a varying strength of rotation of the upper and lower punches, the pressed form body can even be destroyed in the process. A disadvantage with the serration arranged at the punch shaft is, on the one hand, the fact that specially designed upper and lower punches must be used and, on the other hand, that a friction between the serrations of upper and lower punches and the relevant, stationary arranged spur rack occurs because the serration of the upper and lower punches is moved together with these in the axis direction of the upper and lower punches.

In the GB-A-155 594, a rotary press is described which is provided with devices for turning the punches, on whose turn-actuated punch shafts exchangeable punches are envisaged.

A particular disadvantage is the fact that this proposed solution cannot be adopted for punch shafts whose head form does not allow a rotation of the punch (roll-guided punches) and/or heads whose microsection surface requires that the heads have to be moved right through in a certain orientation below the press roll (heavy-duty punch).

The invention is based on the task assignment of developing a category-related rotary press where and with which the adhesive effect of the tablet on the upper and lower punches is securely avoided by means of the generation of turn-off forces on the surface of the tablet, in particular where a punch turn is universally ensured with the use of anti-rotation secured punch shafts, meaning, not only with rotation-symmetrical but also with roll-guided punches.

According to the present invention, a rotary press with anti-rotation secured shafts and exchangeable punches attached thereto are characterised in such a way that the exchangeable punch, opposite its punch shaft in each case, is rotational in design, where a circumferential recess in the trunnion stem of the punch exists, into which a connecting component, in particular a spring thrust piece, engages for the rotational connection of the punch with the punch shaft, and that the shell surface of the exchangeable punch indicates a zone which interacts with a zone of a component arranged location-fixed at the rotary press opposite the punch circumference, in a force-locking or positive locking manner in such a way that the punch receives a rotational movement at a defined point of the pitch circle of the punch circumference.

The external component for the upper punch and the lower punch is radially and elastically bearing-supported as a punch rotating device according to a most preferred embodiment of the invention and executed in such a way that the engagement at the upper and lower punch is separately adjustable and can be brought to differently defined points of the pitch circle, where the external component is radially positional around the pitch circle of the punch circumference.

The preferential execution of the engagement zone of the shell surface of the punch as a separate element allows higher life service and an economical replacement of parts/components subject to wear.

Furthermore and as a result of convenient exchangeability of this separate element, it is possible to adapt production quickly and economically to material-specific features of various press materials, for example when changing over from one product to another.

With a change of the serration, for example, the angular rotation of the punch can be changed, meaning, the path of rotation performed by the punch is extended or shortened. In addition, it is relatively uncomplicated to change over from a positive locking to a force locking connection.

With the invention, rotary presses with rotational and exchangeable punches can be executed for rotation-symmetrical and for roll-guided punches.

According to an alternative embodiment of the invention and instead of the punch, the dies are trunnion-mounted and have a serration or friction surface on their outer sides.

Figure 1:
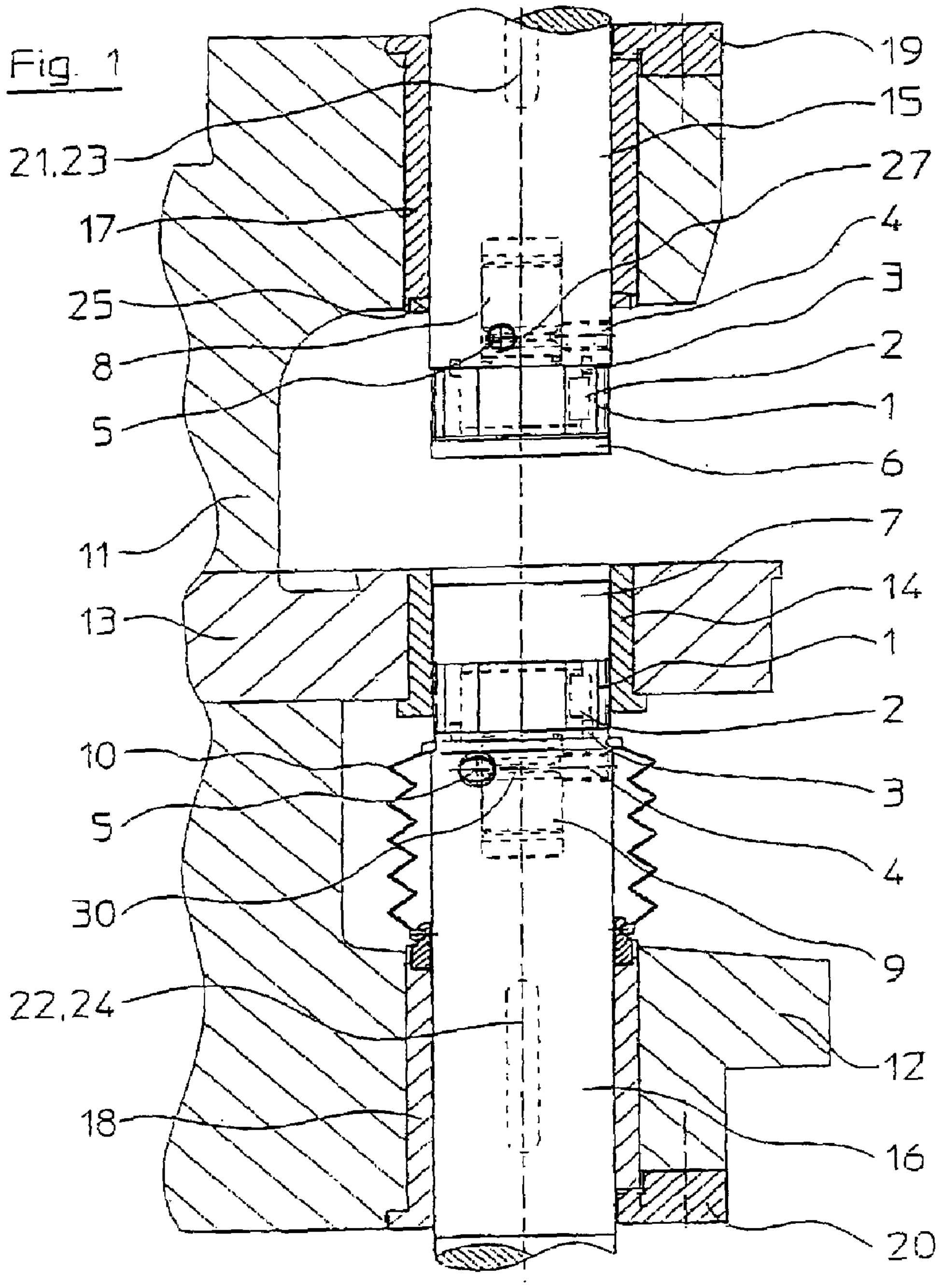
Figure 3A:
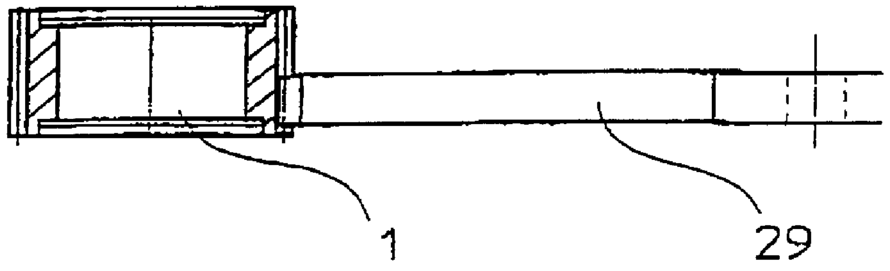
Figure 3B:
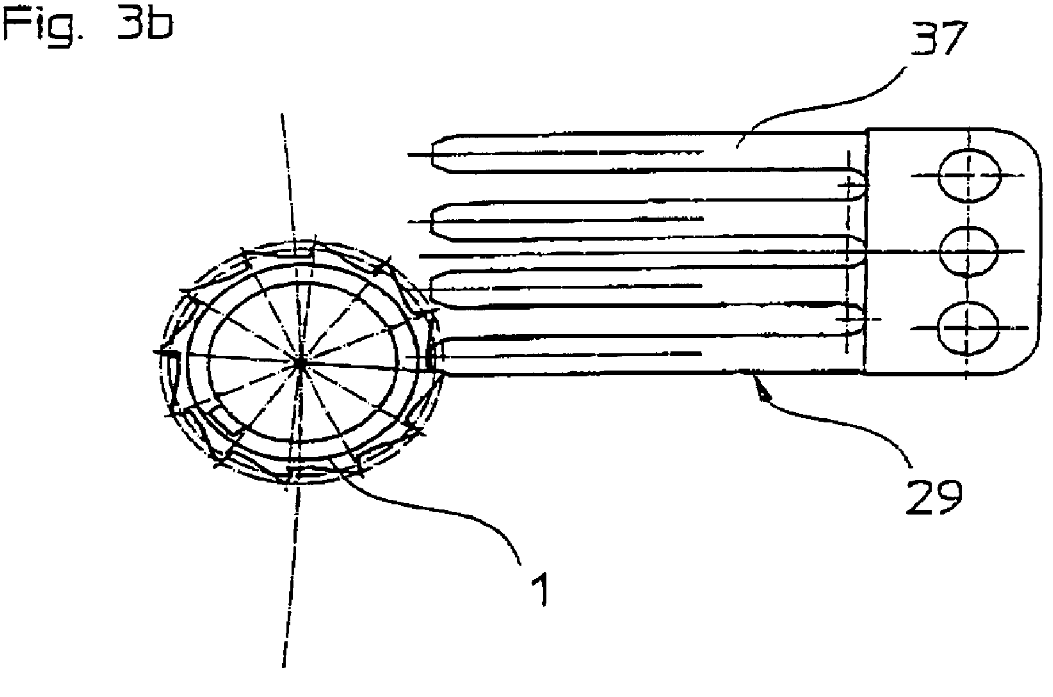

The invention will be better understood by an example of an embodiment, as shown in a drawing, of an upper and lower punch of a rotary press. The drawings illustrate the following items:

FIG. 1: a schematic vertical cross-section through an upper and lower punch in the working position with the upper and lower punch protruding from the die;

FIG. 2: the arrangement according to FIG. 1 in the position with the upper and lower punch inserted into the die, including the external component;

FIG. 3*a*: a side view (partially cross-sectioned) onto detail I according to FIG. 2, and FIG. 3*b*: a top view of detail I from FIG. 2.

In FIG. 1 a part of a known rotary press is shown in a schematic illustration, consisting of an arrangement of rotor upper part 11, die table 13 with die 14 and rotor lower part 12. The upper punch shaft 15 and the lower punch shaft 16 run in guide bushes 17, 18, which are located in the rotor upper part 11 and in the rotor lower part, respectively, and are anti- rotation secured with fitting pieces 19, 20. The guide bushes 17, 18 have fitting key grooves 21, 22, in which fitting keys 23, 24 of the upper and lower punch shafts 15, 16 are arranged. In this way, the punch shafts 15, 16 are also anti-rotation secured with reference to the rotor 11, 12 and the press roll (not shown), respectively.

A seal ring 25 is arranged in the upper guide bush 17 in order to prevent the penetration of dirt and to avoid lubrication oil losses. The lower shaft guide 18 is protected with a bellows 10.

The normally exchangeable but solidly located punches according to the state of the art are, in accordance with the present invention, executed as exchangeable and rotational upper punches 6 and lower punches 7.

This is achieved by means of a circumferential recess 27, 30 in the stem 8, 9 of the upper and lower punch 6, 7. Into this recess 27, 30, a component engages, for example a spring thrust piece 4, for the purpose of positional fixation. In order to additionally secure this fixation of the rotational punch 6, 7 in the direction of movement, a pin 5 engages into the recess 27, 30.

For the purpose of achieving a positive locking between the rotational punch 6, 7 and an external turning device, a mounted element 1 with an outer serration is arranged on a recessed area of the rotational punch 6, 7. The lock-in carrying effect between this element 1 and the rotational punches 6, 7 is ensured by means of a fitting key 2. The outer serration can be directly applied to the punch 6, 7. The separate application of the outer serration onto a separately mounted element 1 has the advantage that it is possible to eliminate wear economically by replacing the mounted element 1, meaning, the entire punch 6, 7 does not have to be replaced.

In FIG. 2, the arrangement of a rotary press is shown where a punch head 32 with guide rolls 31 is envisaged. This embodiment requires an anti-rotation secured shaft 15, 16 of the upper and lower punch 6, 7 corresponding to the FIG. 1.

In the FIG. 2 there is, furthermore, an external component is shown on the periphery of the pitch circle of the punch circumference which is used as a punch turning device 33.

The punch turning device 33 is mounted near the non-illustrated press roll on a dust ring 34 and is moveable with a skid 35 concentrically to the pitch circle in the press roll zone. As a result, the engaging point of the serration elements 29 (FIG. 2) of the punch turning device 33 with the mounted element 1 with outer serration (FIG. 1) can be adjusted in such a way that the most advantageous point with a sufficiently minimised pressing force, which is just being exerted by the press roll, is set. By way of a threaded rod 28 which is connected to the skid 35, the engaging points of the fixed-located serration elements 29 are individually adjustable in the height to the rotational punch 6, 7. This is necessary in order to be able to react to changed insertion depths of the punches 6, 7.

The fixed-located serration elements 29 are horizontally moveable around the threaded rod 28, acting as a vertical axis, with height-adjustable bearing bushes 26. The horizontal movement is restricted to a zone of a few millimeters by means of an elastic and/or spring element 3. By means of a light pressure, set with the elastic and/or spring element 3, onto the rotational punch 6, 7 a carrying torque with a simultaneous evading possibility of the system is produced.

A defined turning movement and, subsequently, a high-precision and synchronous run-in of the serration of the mounted element 1 and of the fixed-located serration elements 29 is not ensured in every case. For this reason, this evading possibility is necessary for a secure and reliable operation.

The high accelerating forces occurring during the impact of the mounted element 1, moving with the circumferential speed of the punches 6, 7, with the outer serration and the fixed- located serration elements 29 can lead to destruction of the serrations at a very early stage. In order to avoid major impact forces of an impulsive nature, the outer serration of the mounted element 1 and the fixed-located serration elements 29 are low-mass in design and executed very elastically as yielding serration elements in according with the illustration in FIG. 3.

In FIG. 3*a*, in a schematic side view, and in FIG. 3*b* in a top view, an embodiment of the serration element 29 and the outer serration of the mounted element 1 is shown, where the fixed-located serration element 29 is executed in a comb-type design with spring elements as prongs 37. Numerous prongs 37 of the serration element 29 ensure that one prong 37 succeeds in establishing an engagement (meshing) with the outer serration of the mounted element 1, in which case the outer serration of the mounted element 1 indicates a purposeful tooth form such as a saw tooth form, trapezoidal tooth form.

The joint between the fixed-located punch shaft 15, 16 and the rotational punch 6, 7 is sealed off by means of a seal 36, such as a labyrinth seal, to protect against material dust and fouling matter of the bearing locations.

As a punch turning device 33 a tangential friction wheel or similar, acting on the punch 6,7, for the purpose of establishing force-locking engagement is also conceivable.

A non-illustrated alternative embodiment of the invention envisages that, instead of the punch 6, 7, the dies 14 are located in trunnion supports, and that these dies have on their outer sides a serration or a friction surface.

And with such a solution also, forces can be produced on the upper surface of the tablets which prevent a sticking of the tablet on the upper and/or lower punch.

REFERENCE NUMBERS LIST

1. Element with outer serration
2. Fitting key
3. Spring element
4. Component, spring thrust element
5. Pin
6. Upper punch
7. Lower punch
8. Punch stem
9. Punch stem
10. Bellows
11. Rotor upper part
12. Rotor lower part
13. Die table
14. Die
15. Upper punch shaft
16. Lower punch shaft
17. Guide bush
18. Guide bush
19. Fitting piece
20. Fitting piece
21. Fitting key groove
22. Fitting key groove
23. Fitting key
24. Fitting key
25. Seal ring
26. Bearing bush

27. Recess
28. Threaded rod
29. Serration element
30. Recess
31. Guide roll
32. Punch head
33. External component (punch turning device)
34. Dust ring
35. Skid
36. Seal
37. Spring element (prongs)

What is claimed is:

1. Rotary press comprising a plurality of punches arrayed in a circle for rotating about the rotary press, each of said punches being an exchangeable punch disposed rotatably about a punch shaft, the punch shaft being secured against rotation with respect to its longitudinal axis, a connecting component residing in a circumferential recess of a stem of the punch effecting a rotational connection of the punch with the punch shaft, an external component residing substantially externally of the circle, a second zone of the external component residing adjacent the circle, a shell surface of the punch comprising a first zone which is engageable with the second zone of the external component, the second zone being fixed with respect to the rotation of the punches about the circle, the first zone and second zone together comprising a means for effecting a force-locking or a positive locking in such a way that the punch receives a turning movement at a defined point of circle.

2. Rotary press according to claim 1, wherein the shell surface of the punch comprises the first zone for interacting with the second zone of the external component.

3. Rotary press according to claim 1, wherein the external component is separately adjustable and moveable into different, defined points of the circle, the external component being radially positionable around the circle.

4. Rotary press according to claim 1, wherein the external component has a bearing location which is radially elastic.

5. Rotary press according to claim 1, wherein a seal seals a joint between the punch shaft and the punch.

6. Rotary press according to claim 1, wherein the first zone of the shell surface of the punch interacts with the second zone of the external component is a separated and exchangeable element of the punch.

7. Rotary press according to claim 1, wherein the first and second zones of the shell surface and the external component, respectively, comprise serration or friction surfaces.

8. Rotary press according to claim 7, wherein the serration or friction surfaces are low in mass and elastic in a circumferential direction.

9. Rotary press according to claim 8, wherein the second zone of the external component is an elastically yielding spring element disposed in a movement direction of the punch, such that the elastically yielding spring element can simultaneously absorb an occurring impact energy and, ensure a secure and reliable engagement into the first zone of the shell surface of the punch.

10. Rotary press according to claim 8, wherein the first zone of the shell surface of the punch comprises a tooth profile adapted to the second zone of the external component.

11. Rotary press according to claim 8, wherein the second zone of the external component comprises at least two spring elements situated one behind the other in movement direction of the punch and arranged in a comb-like manner.

12. Rotary press comprising a plurality of dies and a plurality of punches arrayed in a circle for rotating about the rotary press, each of said punches being an exchangeable punch attached to a punch shaft, the punch shaft being secured against rotation with respect to its longitudinal axis, an external component residing substantially externally of the circle, a second zone of the external component residing adjacent the circle, the dies being trunnion-supported and comprise on their outer sides a first zone which is engageable with the second zone of the external component, the second zone being fixed with respect to the rotation of the punches about the circle, the first zone and the second zone together comprising a means for effecting a force-locking or positive locking, in such a way that the dies receive a rotational movement at a defined point of circle.

13. Rotary press according to claim 1, wherein the connecting component is a spring thrust piece.

14. Rotary press according to claim 5, wherein the seal is a labyrinth seal.

15. Rotary press according to claim 10, wherein the tooth profile is a trapezoidal or a saw tooth profile.

* * * * *